(12) United States Patent
Pozgainer

(10) Patent No.: US 7,721,775 B2
(45) Date of Patent: May 25, 2010

(54) CAP-FREE-FILLER PIPE FOR THE TANK OF A MOTOR VEHICLE

(75) Inventor: Günther Pozgainer, Graz (AT)

(73) Assignee: MAGNA STEYR Fuel Systems GmbH, Sinabelkirchen (AT)

( * ) Notice: Subject to any disclaimer, the term of this patent is extended or adjusted under 35 U.S.C. 154(b) by 268 days.

(21) Appl. No.: 11/722,183

(22) PCT Filed: Dec. 20, 2005

(86) PCT No.: PCT/AT2005/000513

§ 371 (c)(1),
(2), (4) Date: Jul. 3, 2007

(87) PCT Pub. No.: WO2006/066294

PCT Pub. Date: Jun. 29, 2006

(65) Prior Publication Data

US 2007/0261742 A1  Nov. 15, 2007

(30) Foreign Application Priority Data

Dec. 20, 2004  (AT)  .............................. GM921/2004

(51) Int. Cl.
*B60K 15/04* (2006.01)
(52) U.S. Cl. ...................... 141/350; 220/86.2
(58) Field of Classification Search ................. 141/350; 220/86.2
See application file for complete search history.

(56) References Cited

U.S. PATENT DOCUMENTS

| | | | |
|---|---|---|---|
| 3,880,317 A | 4/1975 | Arnett | |
| 5,056,570 A | 10/1991 | Harris et al. | |
| 5,186,220 A | 2/1993 | Scharrer | |
| 6,230,739 B1 | 5/2001 | Gericke | |
| 6,446,826 B1 * | 9/2002 | Foltz et al. | 220/86.2 |
| 6,539,990 B1 * | 4/2003 | Levey et al. | 141/350 |
| 6,637,477 B1 | 10/2003 | Maier | |
| 6,789,586 B2 * | 9/2004 | Levey | 141/350 |
| 6,983,773 B1 * | 1/2006 | Hagano et al. | 141/350 |
| 7,011,121 B2 * | 3/2006 | Bar et al. | 141/350 |
| 7,302,977 B2 * | 12/2007 | King et al. | 141/350 |

* cited by examiner

*Primary Examiner*—Gregory L Huson
*Assistant Examiner*—Nicolas A Arnett
(74) *Attorney, Agent, or Firm*—Bachman & LaPointe, P.C.

(57) ABSTRACT

A cap-free filler neck for a motor vehicle tank comprises a tubular part, which is connected to the tank, and an insert, which insert comprises a funnel part with a throat and a partition part adjoining the throat at the bottom. The upper edge zone of the funnel part and the partition part adjoin the tubular part in a sealing manner. The partition part has a throughflow opening which is closed in a sealing manner by a flap, which can be locked in a closed position, and can be pivoted into an open position counter to the force of a spring by a fuel nozzle. So that, despite the tight closure, rainwater which has penetrated can flow away, the space delimited by the tubular part, the funnel part and the partition part can be brought into connection with the environment via an opening in the tubular part, which opening can be closed by a valve, which is accommodated in said space, by the introduction of the fuel nozzle.

3 Claims, 2 Drawing Sheets

CAP-FREE-FILLER PIPE FOR THE TANK OF A MOTOR VEHICLE

BACKGROUND OF THE INVENTION

The invention relates to a cap-free filler neck for a motor vehicle tank, the upper end of the filler neck's tubular part, which is connected to the tank, containing an insert, which insert comprises a funnel part with a throat and a partition part adjoining the throat at the bottom, wherein the upper end of the funnel part and the partition part adjoin the tubular part in a sealing manner, and wherein the partition part has a throughflow opening which is closed in a sealing manner by a flap, which can be locked in the closed position, and can be pivoted into an open position counter to the force of a spring by a fuel nozzle.

Cap-free filler necks are an attractive solution if the filler neck ends in a trough of the vehicle body, which trough, for its part, is covered by an external flap which is flush with the external contour of the vehicle. The external flap is generally lockable, but does not close tightly, and therefore rainwater may penetrate into the trough. For refueling, the external flap then only needs to be opened and the fuel nozzle to be introduced into the filler neck.

In order to prevent rainwater from penetrating into the tank, the "unleaded flap" which is already present for another purpose is of sealing and lockable design; it is unlocked when the fuel nozzle is introduced through its mouth pipe (if it has the correct diameter). The external flap and the unleaded flap make it unnecessary to have a closure cap for the end of the filling pipe, said closure cap being connectable to the latter by means of a bayonet-type fastening or thread.

Lockable (unleaded) flaps of this type are disclosed, for example, in DE 100 51 212 A1. They are attached to the inner end of a funnel-shaped insert and open inward. However, since the external flap is not watertight, rainwater can collect in and around the insert and, when the fuel nozzle is introduced, may enter the tank as soon as the fuel nozzle unlocks and opens the flap. U.S. Pat. No. 5,056,570 discloses a cap-free filler neck which has a device for the controlled conducting away of fuel vapors.

SUMMARY OF THE INVENTION

It is therefore the object of the invention to improve cap-free filler necks of this type in such a manner that rainwater which has penetrated can flow away without, however, contravening safety regulations or environmental requirements.

According to the invention, this is achieved in that the space delimited by the tubular part, the funnel part and the partition part can be brought into connection with the environment via an opening in the tubular part, which opening can be closed by a valve, which is accommodated in said space, during and by the introduction of the fuel nozzle. The valve is normally open, and therefore rainwater which has penetrated can flow away to the outside through the opening. During refueling, it is closed, and therefore fuel cannot pass to the outside. In order to satisfy all conceivable environmental requirements, the above-mentioned space can even be connected to an activated carbon filter.

In a practical embodiment, the valve is a thin plate which is movable between an open and a closed position, and a spring clip, which rises up into the throat of the funnel part and the free end of which is connected to the thin plate, is fastened to the insert, the spring clip projecting into the throat. A reliable coupling of the movement between fuel nozzle and valve is therefore provided with very simple means. When the fuel nozzle is introduced, its mouth pipe pushes the spring clip aside and thus brings the thin plate to bear from the inside against the opening in the tubular part in a sealing manner.

In a particularly simple and cost-effective development, the spring clip is part of a ring which is attached to the throat of the funnel part and forms further spring tongues which act on locking elements locking the flap. A single, simple punched part can thus take on the function of a plurality of parts at the same time. A further simplification and therefore reduction of the production costs is possible if the throat of the funnel part is separate from the latter and is integral with the partition part, with the ring forming the spring tongues being arranged in the separating gap.

BRIEF DESCRIPTION OF THE DRAWINGS

The invention is described and explained below with reference to figures of an exemplary embodiment, in which.

DETAILED DESCRIPTION

Figure 1:
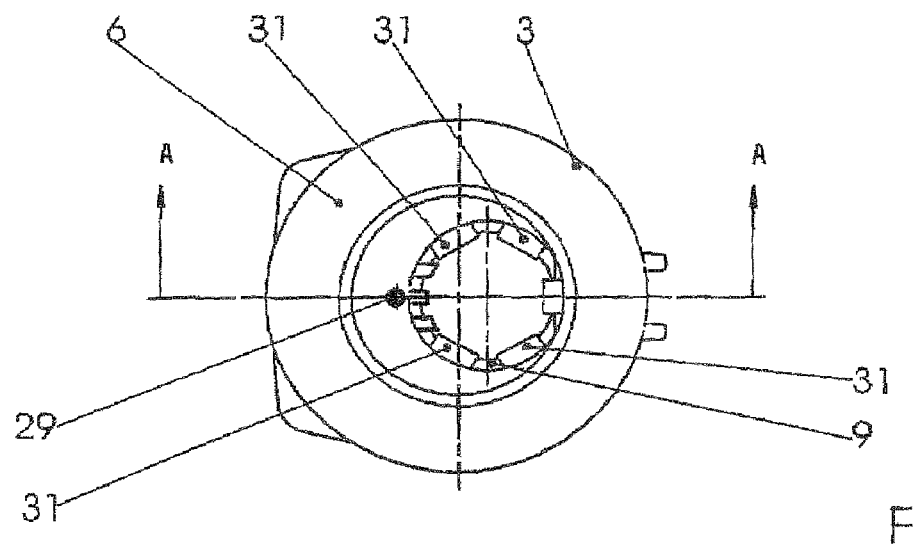
FIG. 1 illustrates a view from above.
Figure 2:
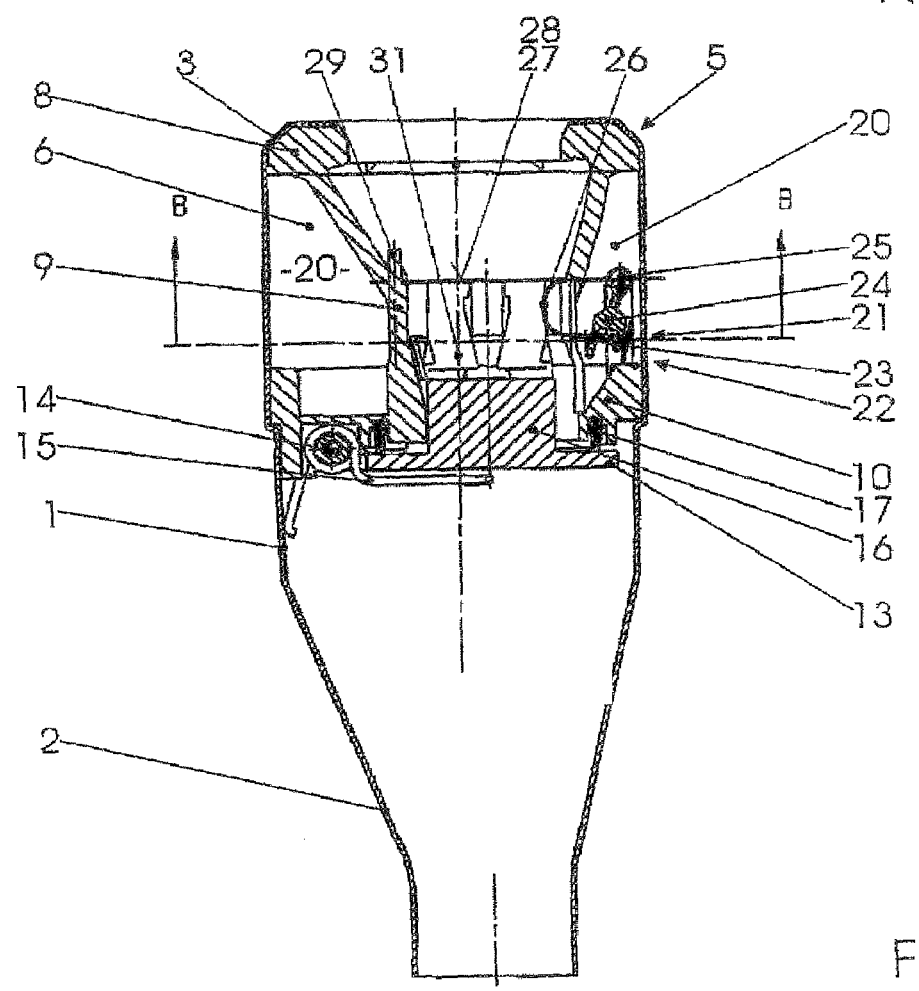
FIG. 2 illustrates a longitudinal section according to A-A in FIG. 1.

In FIGS. 1 and 2, the tubular part of a filler neck according to the invention is referred to by 1. It is essentially cylindrical and, in its lower part, has a constriction 2 via which it is connected to a fuel tank (not illustrated). At the top, it has a crimped portion 3 which comprises the upper edge zone 8 of an insert 5. The insert 5 is composed of a funnel part 6 with the upper edge zone 8 and a throat 9 and of a partition part 10 which bears tightly against the inner wall of the tubular part 1.

A flap 13 is mounted in the partition part 10, which flap can be pivoted about an axis 14 fixed in the partition part 10 and is held by a hairpin spring 15 in the closed position in which its stopper 16 rises up from below into the throat 9. The stopper 16 can be locked in this closed position (see further on). The partition part 10 is provided with an encircling sealing ring 17 against which the flap 13 bears.

The tubular part 1, the funnel part 6 with the throat 9 and the partition part 10 form an annular space 20 which surrounds the throat. The tubular part 1 has an opening 21 which is located as low down and precisely as possible above the partition part 10. A valve, which is referred to overall by 22, is provided in the space 20. It comprises a thin elastic plate 23 which is fastened to a guide arm 24 which can be pivoted about an axis 25 and on which, for its part, a spring clip 26 rests by means of its free end. The spring clip 26 rises up into the throat 9. In the position shown, the valve 22 is open, and therefore water located in the space 20 can flow out to the outside.

If the filling pipe of a fuel nozzle (not illustrated) is introduced into the throat, said filling pipe presses against the spring clip 26, and therefore the latter closes the valve 22 by pressing the thin plate 23 onto the opening 21. It is therefore ensured that fuel overflowing into the space 20 during refueling cannot pass through the opening 21 into the environment.

In the embodiment illustrated, the throat 9 is separate from the funnel part 6 and is connected integrally to the partition part 10. A ring 27 made of spring steel sheet is clamped in the separating gap 28 between funnel part 6 and throat 9, said ring forming the spring clip 26 and also further spring tongues 30.

Funnel part 6 and throat 9 are connected to each other via a number of studs 29 distributed on the circumference of the throat.

Figure 3:
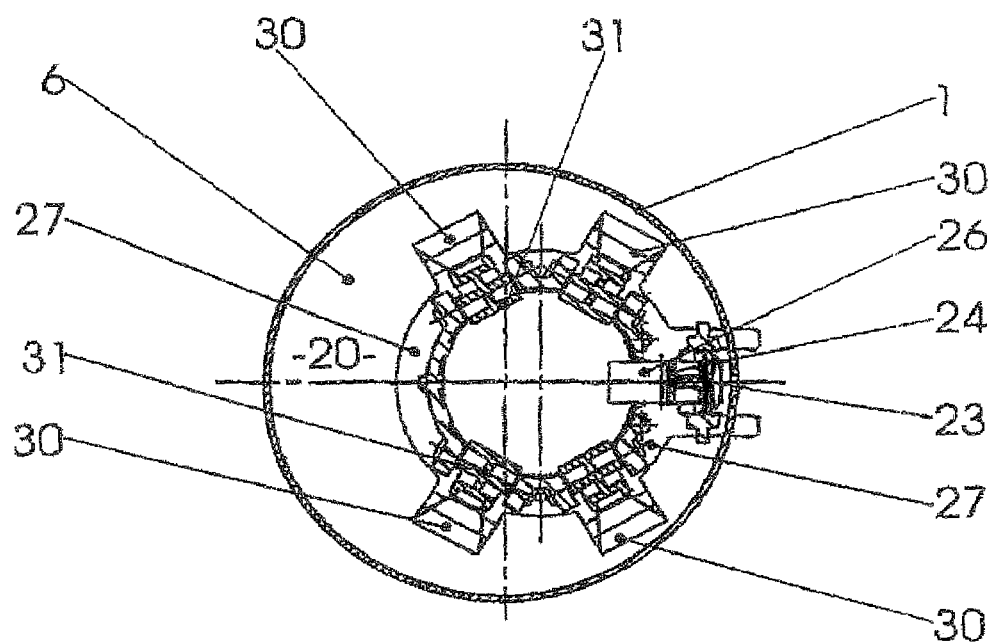
FIG. 3 illustrates a cross section according to B-B in FIG. 2.

The ring 27 with the spring clip 26 and four further spring tongues 30 can be seen in FIG. 3. The further spring tongues 30 act on locking elements 31 which engage in notches (not illustrated) of the stopper 16 and lock the latter in the closed position. The locking elements 31 project somewhat into the throat 9, and therefore they are pivoted outward when the mouth pipe of a fuel nozzle is introduced, with it being possible for them to release the stopper 16 and for the mouth pipe also to open the flap 13.

The entire filler neck is located in a cavity in the motor vehicle body that is covered by an external flap (not illustrated). Said external flap can be locked by means of a lock or can be connected to the central locking system of the motor vehicle. For refueling, said external flap is opened and the fuel nozzle introduced without a further closure or screw cap on the filler neck having to be opened.

The invention claimed is:

1. A cap-free filler neck for a motor vehicle tank comprising:
a tubular part having an upper end configured to connect to the motor vehicle tank, the tubular part having an insert, the insert comprises a funnel part having a throat and a partition part adjoining the throat at the bottom thereof, wherein an upper edge zone of the funnel part and the partition part adjoin the tubular part in a sealing manner, and wherein the partition part has a throughflow opening which is closed in a sealing manner by a flap, which is lockable in a closed position, and is pivotable into an open position counter to a spring force by a fuel nozzle, wherein a space delimited by the tubular part, the funnel part and the petition part is connectable with the environment via an opening in the tubular part, which opening is closed by a valve accommodated in said space, the valve comprises a thin plate movable between an open position and a closed position by the introduction of the fuel nozzle wherein a spring clip rises up into the throat of the funnel part, has a free end connected to the thin plate, and is fastened to the insert, wherein the spring clip projects into the throat.

2. The filler neck according to claim 1, characterized in that the spring clip is part of a ring which is attached to the throat and forms further spring tongues which act on locking elements locking the flap.

3. The filler neck according to claim 2, characterized in that the throat is separate from the funnel part and is integral with the partition part, with the ring forming the spring tongues being arranged in the separating gap between funnel part and throat.

\* \* \* \* \*